United States Patent [19]
Venkatraman et al.

[11] Patent Number: 6,139,177
[45] Date of Patent: Oct. 31, 2000

[54] DEVICE ACCESS AND CONTROL USING EMBEDDED WEB ACCESS FUNCTIONALITY

[75] Inventors: Chandrasekar Venkatraman, Fremont; Jeff Morgan, Cupertino; Thomas A. Shoup, Los Altos; Marcos Frid, San Carlos, all of Calif.

[73] Assignee: Hewlett Packard Company, Palo Alto, Calif.

[21] Appl. No.: 08/846,061

[22] Filed: Apr. 25, 1997

Related U.S. Application Data

[63] Continuation of application No. 08/760,164, Dec. 3, 1996, abandoned.

[51] Int. Cl.[7] .................................................. G06F 17/30
[52] U.S. Cl. ........................................ 364/188; 707/513
[58] Field of Search .................................... 364/146, 188, 364/189; 707/513, 501; 345/326, 331

[56] References Cited

U.S. PATENT DOCUMENTS

| | | | |
|---|---|---|---|
| 5,715,823 | 2/1998 | Wood et al. | 128/660.01 |
| 5,721,908 | 2/1998 | Lagarde et al. | 395/610 |

OTHER PUBLICATIONS

"Disk Drive with Embedded Hyper–Text Markup Language Server", 1995, vol. 38(12), p. 479, IBM Technical Disclosure Bulletin.

Tom Williams, Senior Editor, "Software & Development Tools: Design Trends —Java goes to work controlling networked embedded systems", 1996, pp. 36–37, Computer Design.

Thomas Conrad's TCVG050 LAN Hub, "Weaving the Management Web", 1996, vol. 1, pp. 92 & 94, Data Communications (8178).

EP Search Report.

*Primary Examiner*—Paul P. Gordon
*Attorney, Agent, or Firm*—Thomas X. Li

[57] ABSTRACT

A web access functionality embedded in a device includes modules for generating a device web page wherein the device web page enables selection of at least one control function for the device. The web access functionality also includes modules for accessing the device web page via a communication path such that a user of a web browser accesses the control function for the device through the device web page. The control function includes control functions for loading new information into the device via the communication path and control functions for providing notification messages via the communication path upon the occurrence of events in the device.

21 Claims, 7 Drawing Sheets

FIG. 6

Register Interest Web Page

Notifiable Events for Device 10 — 174

Event_1 EMail: [ ] 180    Event_1 URL: [ ] 170

Event_2 EMail: [ ]    Event_2 URL: [ ]
                 181                        171

Event_n EMail: [ ]    Event_n URL: [ ]
                                  182              172

[Submit]  [Clear]
   176      178

FIG. 8
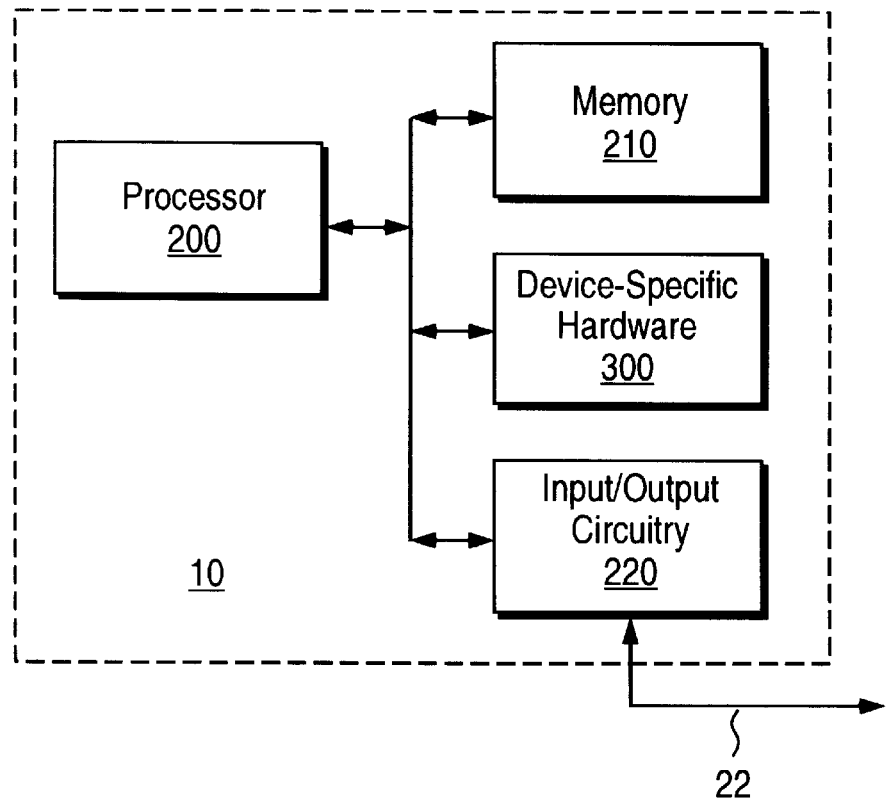
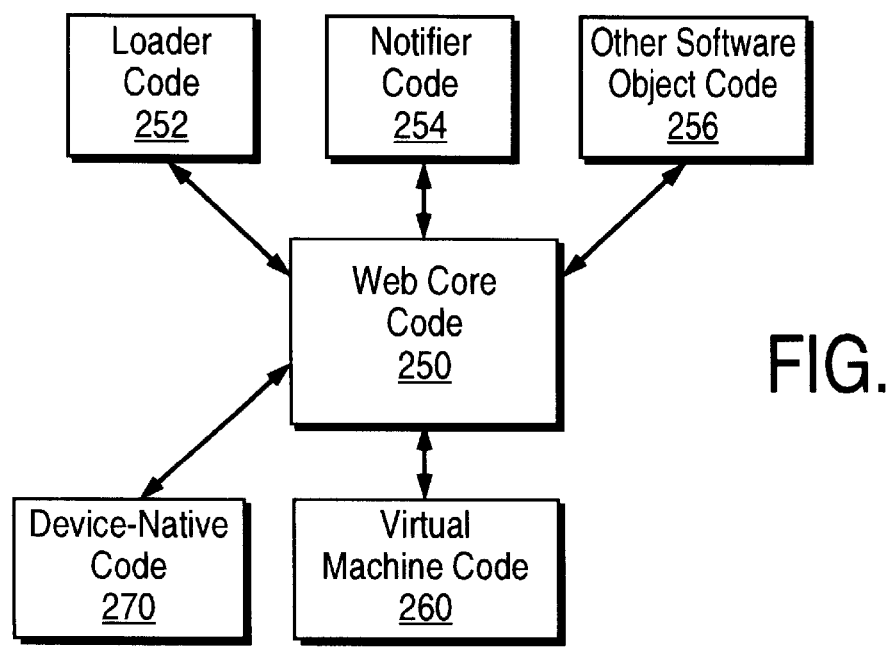
FIG. 9

DEVICE ACCESS AND CONTROL USING EMBEDDED WEB ACCESS FUNCTIONALITY

CROSS REFERENCE TO RELATED APPLICATION

This application is a continuation application of a patent application Ser. No. 08/760,164, now abandoned, May 17, 1997, filed on Dec. 3, 1996, entitled DEVICE ACCESS AND CONTROL USING EMBEDDED WEB ACCESS FUNCTIONALITY, by C. Venkataraman et.al.

BACKGROUND OF THE INVENTION

1. Field of Invention

The present invention pertains to the field of device access and control. More particularly, this invention relates to devices having embedded web functionality for device access and control functions.

2. Art Background

A wide variety of devices including office equipment, home-based equipment, and lab equipment, as well as a variety of other types of devices commonly include device-specific control and access functions. Such devices may also be referred to as gadgets. Office equipment includes, for example, printers, fax machines, copiers, and various types of communication and telephony devices. Home-based devices include home entertainment equipment such as televisions and video and audio players and recorders as well as security systems, automobiles, appliances, thermostats, and hot tubs. Lab equipment includes measurement devices such as oscilloscopes, spectrum analyzers and other types of measurement equipment as well as networking equipment.

The control and access mechanisms of such devices commonly include relatively simple and low cost user input and display mechanisms. Such simple mechanisms may include, for example, light emitting elements such as LED/LCD elements as well as various types of simple input buttons or switches. Such simple mechanisms are typically constructed to be low cost to minimize the overall cost of such devices. In addition, such mechanisms are usually compact and enable relatively small sizes for such devices. Unfortunately, such simple mechanisms severely limit the range and flexibility of the control and access functions provided by such devices.

The control and access functions of such a device may be enhanced by the implementation of a screen-based access and control mechanism within the device. For example, such a device may include a display screen, and a rendering processor along with appropriate software for generating a rich graphical interface suitable for the particular type of device. However, such screen displays and rendering mechanisms are usually expensive and increase the overall cost of the device. Such high costs are typically unsuitable for lower cost devices targeted for a relatively large mass market. Moreover, display screens and associated hardware may be too bulky for the size constraints of many devices.

SUMMARY OF THE INVENTION

A web access functionality embedded in a device includes means for generating a device web page wherein the device web page enables selection of at least one control function for the device. The web access functionality includes means for accessing the device web page via a communication path such that a user of the web browser accesses the control functions for the device through the device web page. The control functions include control functions for loading new information into the device via the communication path and control functions for providing notification messages from upon the occurrence of events in the device.

The web access functionality may be implemented with existing circuitry in a device, such as an existing processor, memory, and input/output circuitry that normally perform device-specific functions, thereby avoiding the extra cost and space required for dedicated web server hardware for the device.

The web access functionality embedded in the device enables device access and control via a variety of communication mechanisms including the world wide web portion of the Internet. The costs of providing screen based control mechanisms are exported away from the device and do not require an external computer to provide web access functionality to a device.

The device control information is packaged using the Hyper-Text Markup Language (HTML) and is transported according to the Hyper-Text Transfer Protocol (HTTP). The HTML and HTTP protocols enable communication with existing web browsers independent of the platform that executes the web browser. The present techniques avoid the need of an industry-wide Application Programming Interface (API) to unify the control and use of equipment.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 6 illustrates a register interest web page in an example embodiment;

FIG. 8 is a hardware block diagram of the device in one embodiment;

FIG. 9 illustrates software elements of the device in one embodiment.

DETAILED DESCRIPTION

Figure 1:
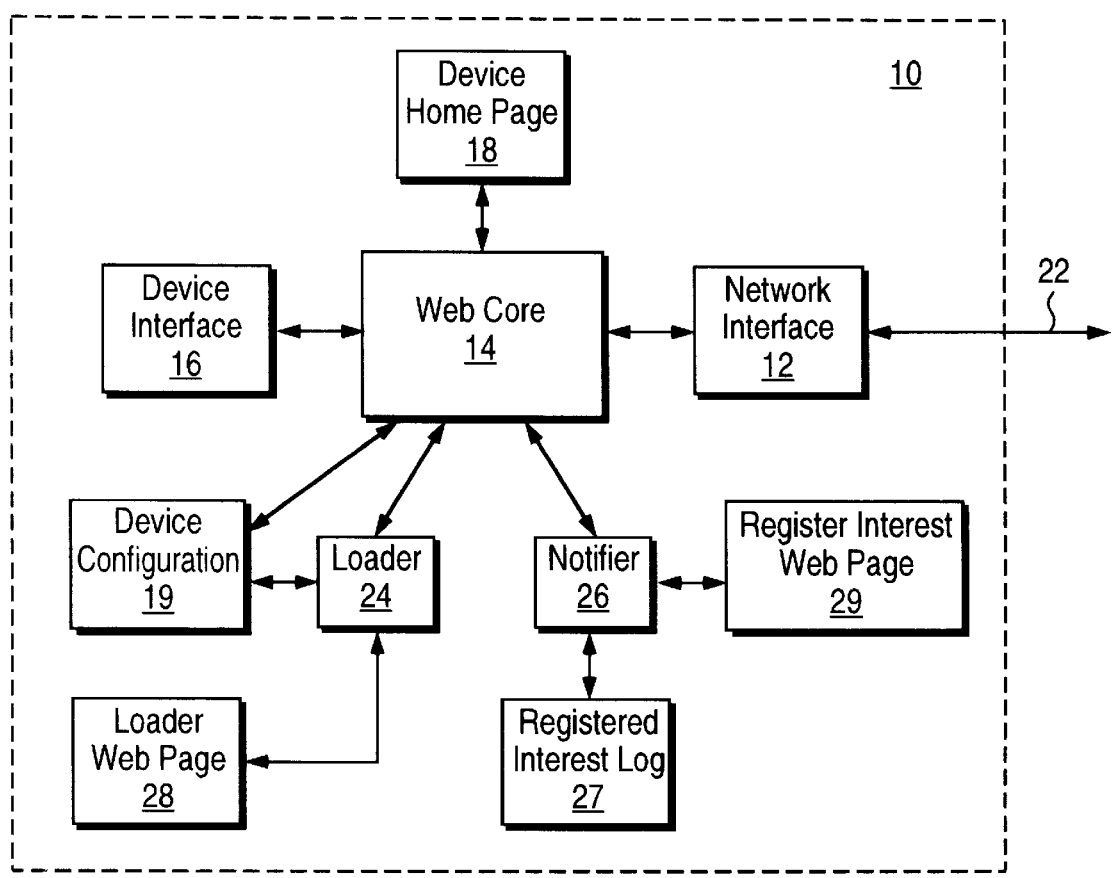
FIG. 1 illustrates a device with embedded web functionality.

FIG. 1 illustrates a device 10 with embedded web functionality for device access and control. The device 10 receives HTTP commands through the network interface 12. The HTTP commands specify one of a set of predetermined Universal Resource Locators (URLs) for the device 10. The predetermined URLs for the device 10 include a URL corresponding to a device home page 18, a URL corresponding to a loader web page 28, and a URL corresponding to a register interest web page 29.

HTTP commands are used by web clients to obtain information from the device 10 including the device home page 18, the loader web page 28, and the registered interest web page 29. In addition, HTTP commands are generated in the device 10 to perform file transfers via the communication link 22 and to obtain new information and software elements for loading into the device 10 and for updating native code in the device 10. HTTP commands are also used by the device 10 to notify users and external software tasks of events associated with the device 10.

The device 10 includes a network interface 12, a web core 14, and a device interface 16. The network interface 12 enables communication via a communication path 22. The web core 14 enables communication via the communication path 22 according to world-wide web protocols including the Hyper-Text Transfer Protocol (HTTP) protocol. The web core 14 enables communication using HTTP GET, HTTP POST, and HTTP PUT methods and enables the transfer of email messages.

The web core 14 enables access to the device home page 18 which is a web page that enables a user to access and control the device 10 using an external web browser. The device home page 18 enables a user of an external web browser to examine and control any software objects installed in the device 10 and to control device-specific functions of the device 10 and to access other information associated with the device 10. In one embodiment, the web core 14 generates the device home page 18 dynamically in response to requests received via the communication path 22.

The web core 14 accesses a device configuration 19 when constructing the device home page 18. The device configuration stores indications of the software objects that are installed in the device 10. The software objects that may be installed in the device 10 include a loader 24 and a notifier 26. The device configuration 19 may also store other configuration information associated with the device 10.

The loader 24 loads new information into the device 10 and installs new software elements into the device 10 in response to requests from web clients of the device 10. The loader 24 generates the loader web page 28 which is accessible via an external web browser. The loader web page 28 enables a user to specify a package file using an external web browser. The package file contains a list of new information elements or software elements for loading and installing into the device 10. Once a package file is specified using the loader web page 28, the loader 24 retrieves the specified package file via the communication link 22 and then downloads each of a elements specified in the package file. The loader 24 also updates the device configuration 19 to reflect the newly installed elements for subsequent accesses to the device home page 18.

The notifier 26 provides the capability of notifying software objects and users of events associated with the device 10. The notifier 26 generates the register interest web page 29 which is accessible via an external web browser. The register interest web page 29 enables a user of a web browser to register email addresses and URLs. The registered email addresses and URLs are subsequently used by the notifier 26 to send messages specifying predetermined events associated with the device 10 as the events occur. The notifier 26 stores registered URLs and email addresses in a registered interest log 27.

The device home page 18 contains links to the loader web page 28 and the register interest web page 29. The device home page 18 is a Hypertext Markup Language (HTML) file. The web core 14 uses the network interface 12 to transfer the device home page 18 to requesting HTTP clients via the communication path 22.

The device home page 18 may include control buttons according to the HTTP protocol that enable various control functions for the device 10 to be initiated from a web client via the communication path 22. The device home page 18 may contain text, images, multimedia files, forms, tables or any object type supported by the HTTP and HTML protocols.

In addition, the web page 18 may contain one or more URLs that specify additional web pages located within the device 10. The web page 18 may also contain one or more URLs that specify additional web pages located external to the device 10. The additional web pages external to the device 10 may be located, for example, on a local communication network or on the Internet world wide web.

The device interface 16 monitors and controls various device-specific functions of the device 10 and signals events associated with the device 10 to the web core 14. The device 10 represents a wide variety of devices including devices such as printers, fax machines, copiers, communication and telephony devices, home entertainment devices such as televisions, video and audio devices as well as appliances such as refrigerators and washing machines, security systems, automobiles, and hot tubs. The device 10 also represents a variety of measurement instruments including oscilloscopes, and spectrum analyzers and other types of measurement devices. In addition, the device 10 represents a variety of computer peripheral devices including mass storage units such as rotating media storage units.

The communication path 22 represents any communication means that is capable of transferring HTML files according to the HTTP web protocol. The communication path 22 may be realized by a wide variety of communication mechanisms including local area networks, telephone lines including cellular telephone links, serial communication links, parallel communication links, power line communication links, and radio and infrared communication links. The communication path 22 may also be a direct Internet connection to the world-wide web.

Figure 2:
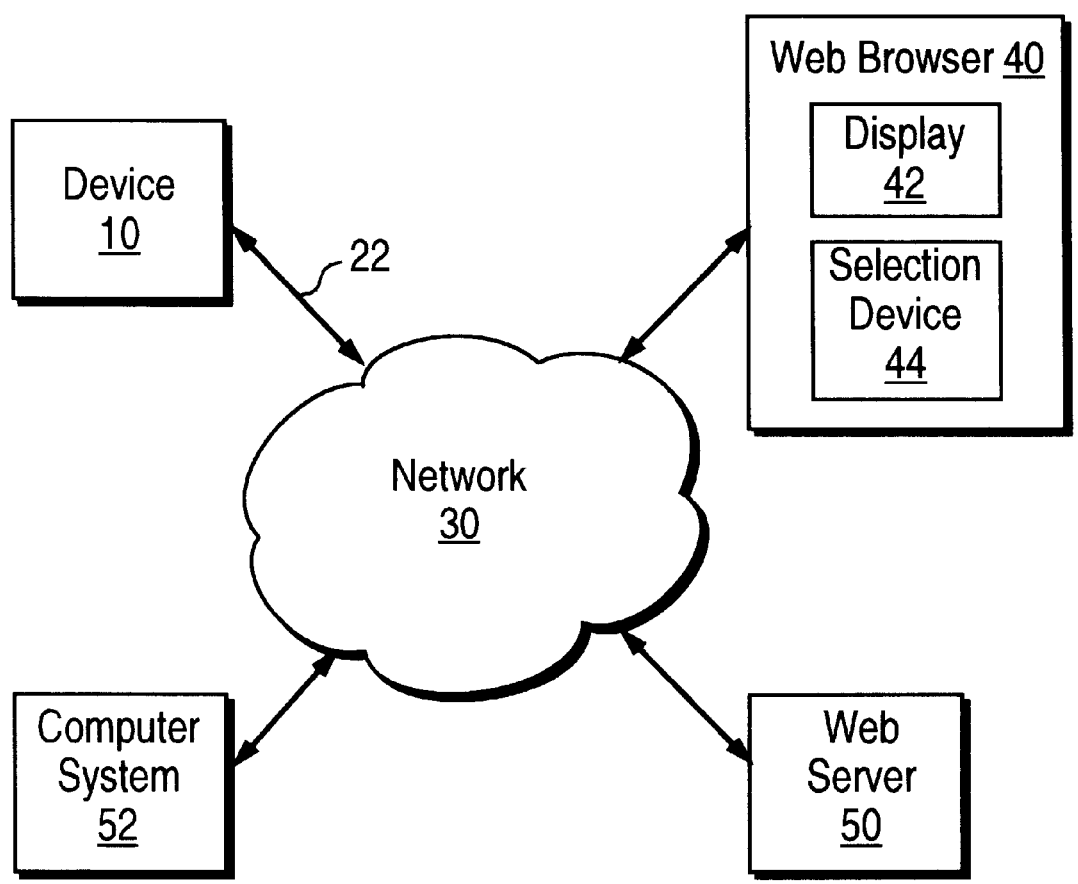
FIG. 2 shows a network that provides access to the control functions of a device from a web browser and that enables the device to communication with a web server and a computer system.

FIG. 2 shows a network 30 including the device 10, a web browser 40, a web server 50 and a computer system 52. The web browser 40 accesses and controls the device 10 via the network 30 by accessing the device home page 18, the loader web page 28, and the register interest web page 29 using HTTP protocols. The device 10 downloads package files, software elements, and software updates via the network 30 from either a web server 50 or a web server functionality implemented in the computer system 52.

In addition, the device 10 transfers email messages and HTTP post commands via the network 30 during event notification. The email addresses contained in the registered interest log 27 may be targeted for users anywhere on the network 30, including, for example, users of the computer system 52 or the web browser 40. The URLs contained in the registered interest log 27 may be targeted anywhere on the network 30 including, for example, web server tasks and corresponding event handling tasks that execute on the computer system 52.

The web browser 40 includes a display 42 for generating visual objects including text, images, multimedia objects, and graphical user interface objects. The web browser 40 includes a selection device 44 that enables a user to select objects and URL links rendered on the display 42 and to enter information into forms rendered on the display 42. The web browser 40 may also include an audio capability that enables rendering of audio information to the user.

The web browser 40 may be embodied in a computer system that executes a set of web browser software. Such a computer system with web browser functionality may be realized by any one of a variety of available computer system platforms including Windows platforms, Macintosh platforms, Unix platforms as well as any other platform capable of executing web browser software that provides HTTP client functions and that renders HTML files.

The web browser 40 may also be embodied in a variety of other devices that provide HTTP client functions and that render HTML files. Such devices include specialized hardware designed for television or telephone systems as well as low cost web browser devices and network computers.

The network 30 may be implemented with a variety of communication mechanisms including mechanisms suitable for a home-based network including power line communication links, twisted pair communication links, radio frequency communication links, and infrared communication links. The network 30 may also be implemented with a variety of larger communication mechanisms including local area networks connected together by various types of communication links. The network 30 may include connections the world-wide web of the Internet for world-wide communication between the web browser 40 and the device 10. The communication network 30 may include one or more communication bridges between the world-wide web and local area networks and home-based networks.

The network 30 may also enable communication among other as home appliances, home security systems, home entertainment devices, air-conditioning systems and hot-tubs which implement the device web functionality disclosed herein.

A user accesses the device home page 18 of the device 10 using a web browser such as the web browser 40. The user enters a URL corresponding to the device home page 18 into the web browser 40. In response, the web browser 40 transfers an HTTP command which includes the entered URL over the network 30. The device 10 receives the HTTP command via the communication path 22 and recognizes the URL contained therein. In response, the device 10 returns the device home page 18 to the web browser 40 via the network 30.

In one embodiment, the web core 14 generates the device home page 18 on the fly in response to the HTTP command from the web browser 40. In such an embodiment, the web core 14 reads the device configuration 19 after receiving the HTTP command and recognizing the URL contained therein. The web core 14 uses information contained in the device configuration 19 to generate an HTML formatted file that defines the device home page 18 and transfers the HTML formatted file to the web browser 40 via the network 30.

In another embodiment, the contents of the device home page 18 are periodically updated by web core 14 and stored in HTML format in a memory in the device 10. In such an embodiment, the web core 14 reads the device home page 18 from the memory in response to the HTTP command from the web browser 40 and transfers the device home page 18 to the web browser 40 via the network 30.

The HTML file that defines the device home page 18 is transferred according to the HTTP protocol and specifies the URL corresponding to the web browser 40. The web browser 40 receives the HTML file and renders the device home page 18 on the display 42. The following is an example HTML file that defines the device page 18 in an example embodiment.

```
<TITLE>DEVICE HOME PAGE</TITLE>
<H1>Home Page for Device 10</H1>
<HR>
<table border>
<caption>Installed Objects</caption>
<TR>
<TD>Object Name</TD>Description</TD>
</TR>
<TR>
<TD> <A HREF = "URL for Loader"> Loader
</A> </T1> </TD>Load New Information Into Device 10</TD>
</TR>
<TR>
<TD> <A HREF = "URL for Notifier"> Notifier
</A> </T1> </TD> Notifies of Events in Device 10</TD>
</TR>
<P>
<HR>
```

Figure 3:
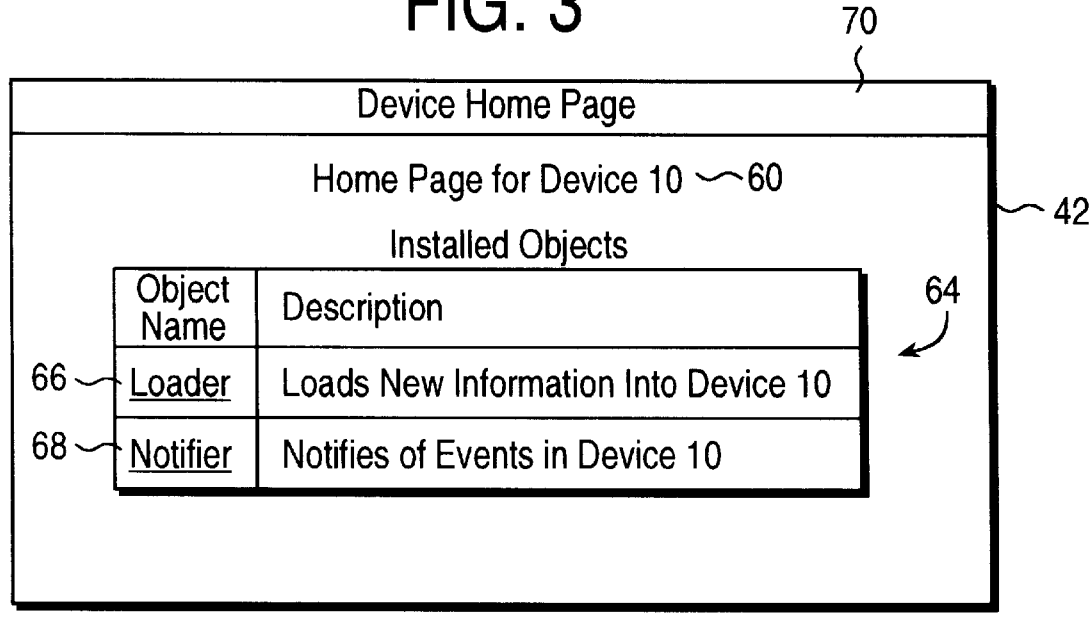
FIG. 3 illustrates an example device home page that provides access to control function of the device.

FIG. 3 illustrates the device home page 18 for the example HTML file shown above. The device home page 18 is rendered on the display 42 by the web browser 40 in response to the example HTML code set forth above. The device home page 18 includes a page title 70, a header section 60, and a table section 64 that lists software objects installed in the device 10 and that includes a set of hyperlinks 66–68 to the installed software objects.

The page title 70 is defined by the HTML <TITLE> Device Home Page</TITLE> coding shown above. The header section 60 is defined by the HTML code <H1> Home Page for device 10</H1> in the HTML file shown above. The table section 64 is defined with coding in the HTML file shown above and provides the hyperlink 66 to the loader 24 and the hyperlink 68 to the notifier 26.

The device home page 18 may include hyperlinks that direct the web browser 40 to other web pages for various device support functions. For example, a hyperlink may be included to direct the web browser 40 to a web page for information regarding device 10 service contracts. Similarly, hyperlinks may be provided to web pages for ordering supplies for the device 10 and obtaining information for future products from the manufacturer of the device 10.

The device home page 18 may also include manuals, parts lists, and other associated publications for the device 10. These publication may be stored within the device 10 in, for example, a nonvolatile memory, or may be referenced elsewhere via hyperlinks contained in the device home page 18. These publications may contain dynamic information such as updated manuals as well as new and updated software driver routines for the device 10.

A user accesses the loader 24 in the device 10 by selecting the hyperlink 66 using the web browser 40. In response, the web browser 40 obtains the URL for the loader 24 from the device home page 18 stored in the web browser 40 and transfers an HTTP command which includes the URL for the loader 24 over the network 30. The web core 14 receives the HTTP command via the communication path 22 and recognizes the URL for the loader 24 contained therein. The web core 14 passes the received HTTP command to the loader 24. The loader 24 then provides the loader web page 28 to the web core 14 which transfers the loader web page 28 to the web browser 40 over the network 30.

In one embodiment, the loader 24 generates the loader web page 28 on the fly in response to an HTTP command from the web browser 40 containing the appropriate URL.

The loader 24 generates an HTML formatted file that defines the loader web page 28 and transfers the HTML formatted file to the web core 14 for transfer via the network 30. The HTML file corresponding to the loader web page 28 is transferred according to the HTTP protocol which specifies the URL corresponding to the web browser 40. The web browser 40 receives the HTML file and renders the loader web page 28 on the display 42.

Figure 4:
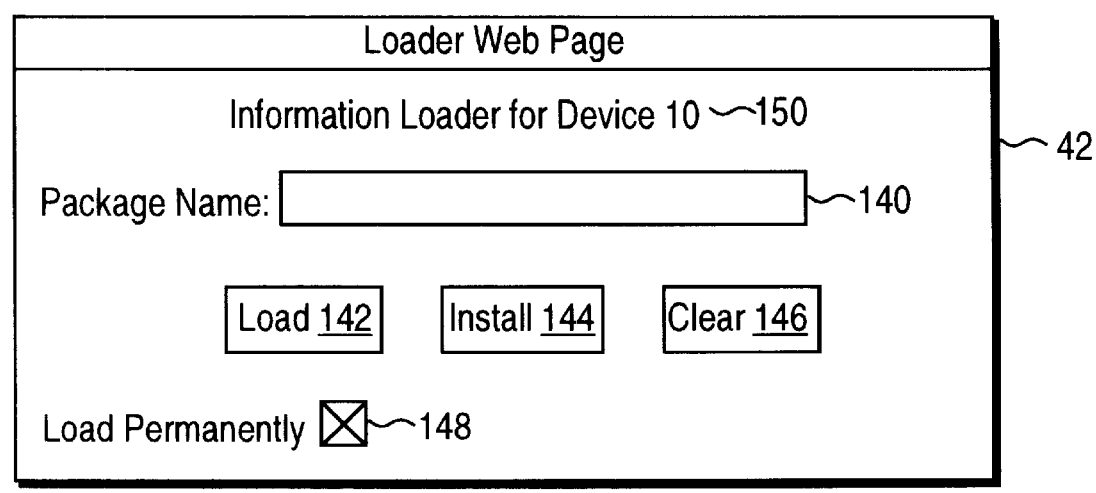
FIG. 4 illustrates a loader web page in an example embodiment.

FIG. 4 illustrates the loader web page 28 in an example embodiment. The loader web page 28 is rendered on the display 42 by the web browser 40 and includes a header section 150, an input form 140, a load button 142, an install button 144, a clear button 146, and a check box 148.

A user of the web browser 40 enters a URL for a package file into the form 140. The user then selects the load button 142 to load information contained in the package file into the device 10. The user selects the install button 144 to install software objects contained in the package file into the device 10. The user selects the clear button 146 to clear the form 140. The user selects the check box 148 if the software objects contained in the package file are to be installed permanently in the device 10 (in for example a persistent memory in the device 10).

Once the form 140 is submitted using the load button 142 or the install button 144, the web browser 40 transfers an HTTP command containing the entered package name and associated information from the form 140 and the URL of the loader 24 to the device 10 via the communication network 30. The associated information includes indications of whether the user selected the load button 142 or the install button 144 and whether the box 148 was checked. The web core 14 passes the HTTP command and data to the loader 24 as a load request.

Figure 5:
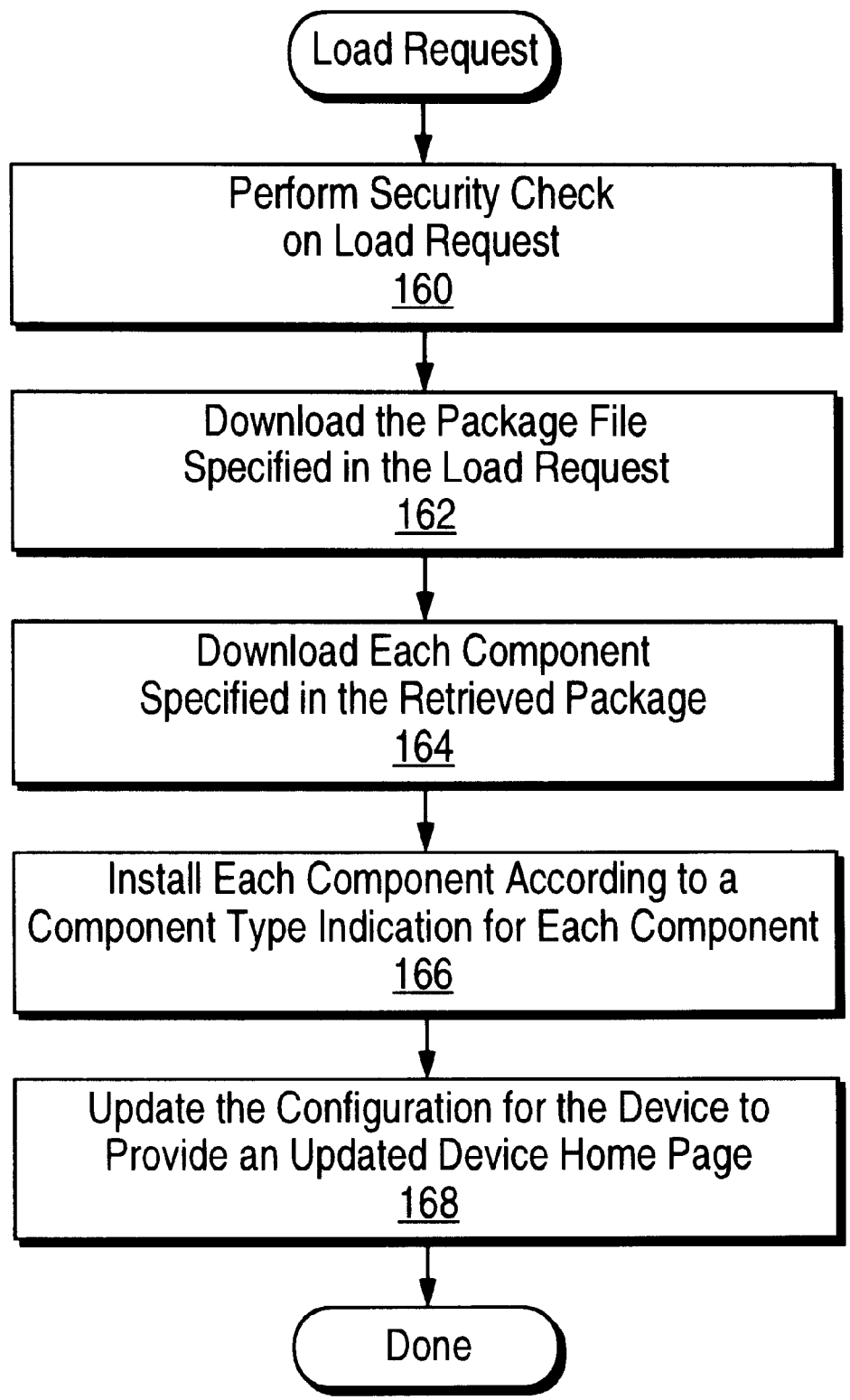
FIG. 5 illustrates the handling of a load operation in the device.

FIG. 5 illustrates the handling of a load request by the loader 24. At step 160, the loader 24 performs a security check on the load request in order to prevent unauthorized tampering with the device 10. In one embodiment, the security check at step 160 is an authorization check on the IP address of the web browser that originated the load request. A list of authorized IP addresses may be stored in a persistent memory within the device 10. In other embodiment, more sophisticated security check mechanisms may be employed.

If the security check passes at step 160, then at step 162 the loader 24 downloads the package file specified by the URL contained in the load request. The loader 24 uses file transfer services provided by the web core 14 to perform the file transfer of the package file via the network 30. The package file may be store anywhere on the network 30. For example, the package file may be stored on the web server 50 or the computer system 52.

The package file in one embodiment is a text file that lists URLs of one or more components to be loaded or installed and further specifies a type indication for each component. The type indication specifies whether the corresponding component is part of a new software object to be loaded into the device 10 or part of native code to be installed into the device 10.

At block 164, the loader 24 downloads each component specified in the package file retrieved at step 162. The loader 24 again uses the file transfer services provided by the web core 14 to download the specified components. At step 166, the loader 24 installs each component downloaded according to the corresponding type indications. New software object components are installed in an address space allocated to software objects such as the loader 24 or the notifier 26 while new native code is installed in memory space allocated for native code. The address space for software objects and native code may be contained in the same memory or different memories in the device 10.

At step 168, the loader 24 updates the device configuration 19 to reflect the newly installed software components. The updated device configuration 19 is used by the web core 14 to construct an updated device home page 18 in response to subsequent accesses by external web browsers.

A user may register an interest in events that occur in the device 10 by selecting the hyperlink 68 of the device home page 18. In response to selection of the hyperlink 68, the web browser 40 obtains the URL for the notifier 26 from the device home page 18 stored in the web browser 40 and transfers an HTTP command which includes the URL for the notifier 26 over the network 30. The web core 14 receives the HTTP command via the communication path 22 and recognizes the URL for the notifier 26 contained therein. The web core 14 passes the received HTTP command to the notifier 26. The notifier 26 then provides the register interest web page 29 to the web core 14 which transfers it to the web browser 40 over the network 30. In one embodiment, the notifier 26 generates the register interest web page 29 as an HTML file on the fly in response to an HTTP command from the web browser 40.

FIG. 6 illustrates the register interest web page 29 in an example embodiment. The register interest web page 29 is rendered on the display 42 by the web browser 40 in response to the HTML file generated by the notifier 26. The register interest web page 29 includes and input form with a set of input fields 170–172 and 180–182, along with a submit button 176, and a clear button 178 which is used to reset the input form.

The input form of the register interest web page 29 enables users to register interests in any one or more of a predetermined set of events EVENT_1 through EVENT_n that may occur within the device 10. The input fields 170–172 enable a user to register a URL for any one or more of the predetermined events EVENT_1 through EVENT$_{13}$ n. The input fields 180–182 enable a user to register an email address for any one or more of the predetermined events EVENT_1 through EVENT$_{13}$ n.

A user of the web browser 40 makes an entry into any one or more of the fields 170–172 and 180–182 and selects the submit button 176. In response to the submit button 176, the web browser 40 transfers the contents of the fields 170–172 and 180–182 along with the URL of the notifier 26 to the device 10 using the HTTP protocol. For, example, the information may be carried using an HTTP get command with embedded data via the communication network 30. The web core 14 passes the HTTP command and data to the notifier 26.

The notifier 26 receives the command and data containing the information from the fields 170–172 and 180–182 from the web core 14 and stores the information in the registered interest log 27. The registered interest log 27 accommodates multiple email addresses and multiple URLs for each of the predetermined events EVENT_1–n. The URLs and email addresses in the registered interest log 27 are read by the notifier 26 when notifying software objects associated with those URLs and users associated with those email addresses of the occurrence of the corresponding events.

The contents of the registered interest log 27 may be used by the notifier 26 when constructing the register interest web page 29. The currently registered interests from the registered interest log 27 may be included in the register interest web page 29 in, for example, an HTML table structure.

Figure 7:
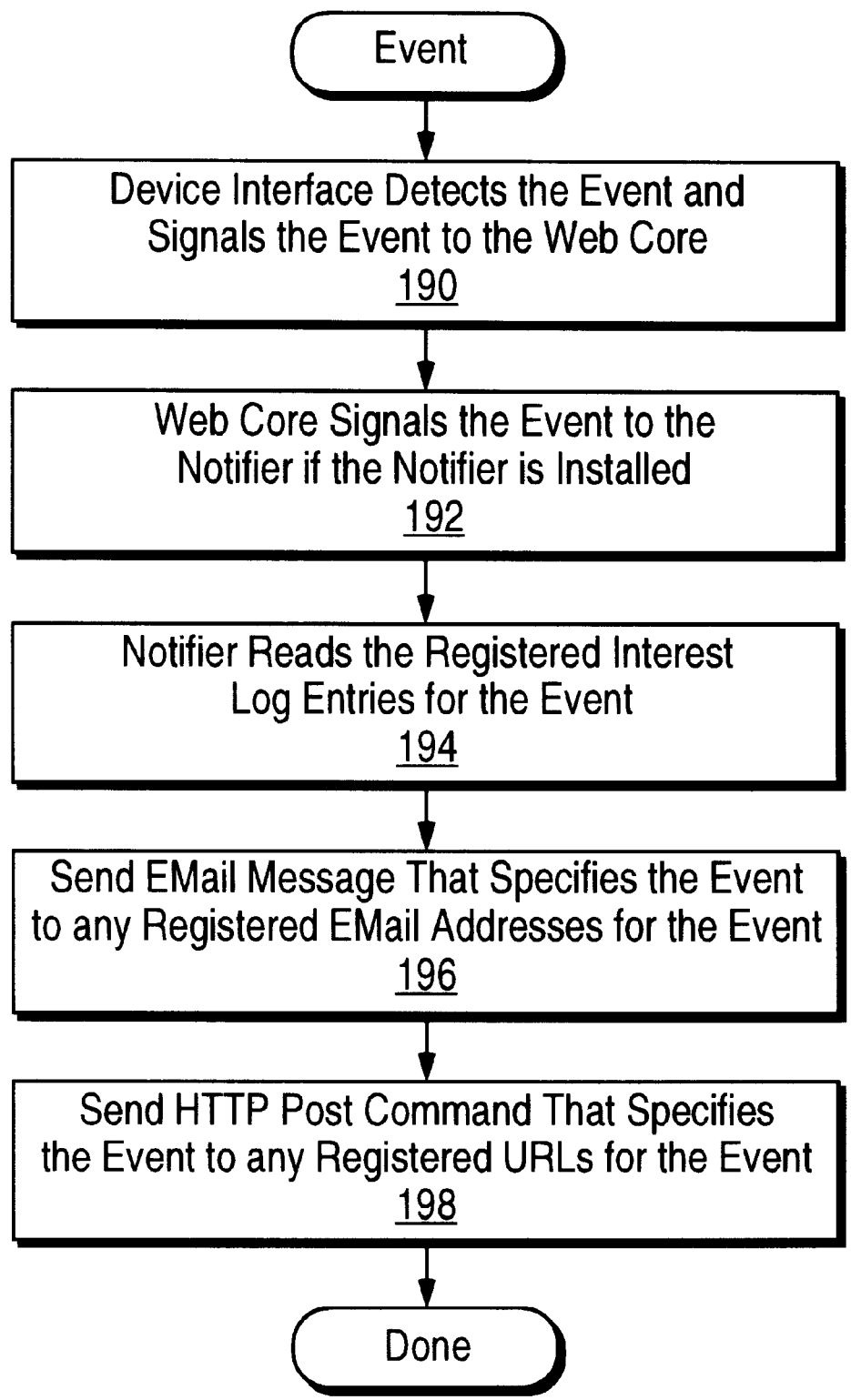
FIG. 7 illustrates the handling of event notification in the device.

FIG. 7 illustrates the handling of event notification in the device 10. At step 190, the device interface 16 detects an event in the device 10 and signals the event to the web core 14. The event detected at step 190 is one of the predetermined set of notifiable events EVENT_1 through EVENT_13 n for the device 10.

At step 192, the web core 14 signals the event to the notifier 26 if the notifier 26 is installed. The web core 14 tests the device configuration 19 to determine whether the notifier 26 is installed in the device 10.

At step 194, the notifier 26 reads the registered interest log 27 to determine whether any users or URLs have been registered for the event signaled at step 192.

At step 196, the notifier 26 constructs an email message for each of the registered email addresses obtained from the registered interest log 27 for the signaled event. Each email message includes ascii text that identifies the signaled event. The notifier 26 uses email services provided by the web core 14 to transfer the email messages to the specified email addresses via the network 30.

At step 198, the notifier 26 constructs an output file for transfer using the HTTP post method for each URL registered for the signaled event. Each output file contains an indication of the signaled event and specifies a registered URL as a destination for the output file. The notifier 26 provides the output file to the web core 14 for transfer over the network 30 to the specified URLs using the HTTP post method.

The output files generated at step 198 may contain optional data which is encoded using Internet Media Type protocols which is also referred to as Multipurpose Internet Mail Extensions (MIME) encoding. This encoding enables transfer of a wide variety of information including graphical information to the registered URLs. The registered URLs may correspond to web server tasks located anywhere on the network 30. Such a registered web server task may, for example, generate a dialog box on a display screen of a computer system to display the event and data to a user.

FIG. 8 is a hardware block diagram of the device 10. The device 10 includes a processor 200, a memory 210, a set of device-specific hardware 300, and a set of input/output circuitry 220 that enables communication via the communication path 22. The processor 200 performs device-specific functions for the device 10 in combination with the device-specific hardware 300. The processor 200 is also employed to provide web functionality in the device 10. The memory 210 may be a static memory such as read-only memory, a flash memory, or a disk drive or may be a volatile memory such as a random access memory.

The web functions of the device 10 may in some embodiments be implemented on a single integrated circuit chip including a processor and memory for holding software for servicing the HTTP protocol. In such an embodiment, the hardware portion of the network interface 12 may be implemented on the same integrated circuit chip as the processor or may be external to that chip. In another embodiment, the web functions of the device 10 are implemented with a state machine.

The processor 200 executes a set of device-native code which may be stored in the memory 210. The processor 200 also executes web functionality code including code for the web core 14, the loader 24, and the notifier 26. The processor 200 also executes code for the device interface 16 which provides a software interface to the device-specific hardware 300 and which monitors the device-specific hardware 300 for the predetermined events EVENT_1–n. The processor 200 also includes code for performing communication through the input/output circuit 220 to provide the network interface 12.

The memory 210 may be a persistent memory which accommodates storage of software elements of the device 10 including device-native code and the web functionality code. The memory 210 may also store the device configuration 19 and the registered interest log 27. The memory 210 may be used to store the device home page 18, the loader web page 28, and the register interest web page 29 in some embodiments.

In one embodiment, the device 10 is a printer device wherein the processor 200 and the memory 210 preform image rendering functions and the device-specific hardware 300 includes printer hardware and associated circuitry and wherein the input/output circuitry 220 provides network access to the printer device 10. The loader 24 in this embodiment enables loading of other software objects into the printer including the notifier 26 and enables loading of updates for the native code that performs printer functions. The loader 24 in this embodiment also enables loading of printer manuals and other text based information associated with the printer device. The notifier 26 in this embodiment provides email messages or HTTP post method notification for predetermined events such as new toner cartridge required or paper input bin empty.

In another embodiment, the device 10 is a video player/recorder wherein the processor 200 and the memory 210 perform functions for reading video and audio information from and writing video and audio information to a storage media such as magnetic tape or an optical storage media. The device-specific hardware 300 includes media actuation hardware such as motors and magnetic heads and associated circuitry for reading and imparting information onto the storage media. The loader 24 in this embodiment enables loading of other software objects into the video player/recorder including the notifier 26 and software updates for the native code that performs video player/recorder functions. The loader 24 also enables the loading of programming information into the video player/recorder. The device home page 18 in this embodiment may provide hyperlinks to television programming guide web sites accessible via the network 30 and the loader 24 may automatically load programming information from such a web site and automatically program the video player/recorder by invoking the device-native code for the video player/recorder. The notifier 26 in this embodiment may provide email messages or HTTP post method notification for predetermined events such as end of tape indications.

In yet another embodiment, the device 10 is a home-entertainment device such as an audio system. The input/output circuitry 220 such as infrared communication circuitry or power line communication circuitry enables a web browser such as a home computer to access the audio system via a home-based network.

In another embodiment, the device 10 is a controller module or control computer contained in an automobile. The input/output circuitry 220 such as cellular transmitter/receiver circuitry enables a web browser to access control and status information for the automobile which is provided by the device home page 18.

In another embodiment, the device 10 is a compact web server wherein the memory 210 is a mass storage device such as a disk drive or other type of compact media drive. The input/output circuitry 220 such as local area network interface circuitry enables a web browser to access the mass storage device. The loader 24 in this embodiment enables loading of new information onto the storage drive and the web core 14 enables access to files on the storage drive via the device home page 18.

In yet another embodiment, the device 10 is a home-entertainment device such as an audio system. The input/output circuitry 220 such as infrared communication circuitry or power line communication circuitry enables a web browser such as a home computer to access control and status information for the audio system which is contained in the device home page 18.

In yet another embodiment, the device 10 is a washing machine wherein the processor 200 and the memory 210 preform functions for controlling wash cycles. The device-specific hardware 300 includes hardware such as motors, valves, sensors, and associated circuitry. The web functionality is embedded into the washing machine 10 by providing software or firmware for the processor 200 and by utilizing space available in the memory 210 and by adding the input/output circuitry to the machine control circuitry.

In another embodiment, the device 10 is a docking station for portable blood analyzer that performs predetermined analyses on a blood sample. The docking station read measurements obtained by the portable blood analyzer and assembles the information into a blood analyzer web page for access by a web browser coupled to a network.

FIG. 9 illustrates software elements of the device 10 in one embodiment. The software elements include device-native code 270 and virtual machine code 260. The device native code 270 performs the native functions of the device 10 such as printer functions video functions etc. as describe above. The device-native code 270 may be updated using the functions provided by the loader 24.

The virtual machine code 260 provides an execution environment for web core code 250 which provides the functions of the web core 14. The virtual machine code 260 also provides and execution environment for the loader code 252 and the notifier code 254 which provide the functions of the loader 24 and the notifier 26, respectively. The loader 24 enables loading of other software object code 26 that performs other specialized functions in the device 10.

In one embodiment, the virtual machine code 260 provides an interpreter for java code. The java execution environment provided by the virtual machine code 260 enables execution of a variety of widely available web access code available for a wide variety of processor platforms. Such web access code includes code for web server and web client functionality as well as email functionality. In other embodiments, other virtual machine environment may be used such as smalltalk environments.

The web core code 250 provides an application programming interface (API) for the loader code 252 and the notifier code 254 and other software object code 256. In one embodiment, the API provided by the web core code 250 comprises a set of java classes and the loader code 252, the notifier code 254, and the other software object code 256 each comprise executable java byte code.

The web core code 250 provides a library of routines for use by the loader code 252, the notifier code 254, and the other software object code 256. The library routines include routines for building HTML documents and routines for streaming HTML data via the communication path 22. The library also contains routines for sending email messages and routines for performing file transfers via the communication path 22. The library also contains routines for embedding java applets in HTML documents.

In addition, the web core code 250 includes routines for detecting predetermined events which are handled by the device native code 270 and routines for writing newly downloaded updates the device-native code into the appropriate address space.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A web access mechanism embedded in a device, comprising:
    means for generating a device web page wherein the device web page enables selection of at least one control function for the device;
    means for accessing to the device web page via a communication path such that a user of a web browser accesses the control function for the device through the device web page.

2. The web access mechanism of claim 1, wherein the control function is a loader function that enables loading of new information into the device via the communication path.

3. The web access mechanism of claim 2, further comprising means for generating a loader web page that enables the user to access the loader function via the communication path.

4. The web access mechanism of claim 3, wherein the means for generating a loader web page comprises means for generating a loader web page that enables the user to enter a URL for a file that contains information regarding the new Information.

5. The web access mechanism of claim 4, wherein the information regarding the new information includes a URL for each of a set of components of the new information.

6. The web access mechanism of claim 5, wherein the information regarding the new information includes a type indication for each component.

7. The web access mechanism of claim 6, wherein the type indication specifies that the component corresponds to native code in the device that performs device specific functions.

8. The web access mechanism of claim 6, wherein the type indication specifies that the component corresponds to a software object for performing a new control function in the device.

9. The web access mechanism of claim 2, further comprising means for updating a device configuration for the device such that the device configuration reflects the new information loaded into the device.

10. The web access mechanism of claim 2, further comprising means for performing a security check on the user before loading the new information into the device.

11. The web access mechanism of claim 2, wherein the new information comprises an update of native code for the device that performs device-specific functions.

12. The web access mechanism of claim 2, wherein the new information comprises a new software object that performs a web access function for the device.

13. The web access mechanism of claim 2, wherein the new sofware object performs a notifier function that enables the device to send a notification message via the communication link upon the occurrence of a predetermined event in the device.

14. The web access mechanism of claim 13, wherein the notification message is an email message.

15. The web access mechanism of claim 13, wherein the notification message is sent via the communication link using an HTTP post method.

16. The web access mechanism of claim 1, wherein the control function is a notifier function that sends a notification message over the communication path when one of a predetermined set of events occurs for the device.

17. The web access mechanism of claim 16, further comprising means for generating a web page that enables the user to register at least one interest in the predetermined events via the communication path.

18. The web access mechanism of claim 17, wherein the means for generating a web page that enables the user to register at least one interest comprises means for generating a web page that enables the user to register at least one email address for any one or more of the predetermined events.

19. The web access mechanism of claim 18, further comprising means for sending an email message specifying any one of the predetermined events to the email address registered for the any one of the predetermined events.

20. The web access mechanism of claim 17, wherein the means for generating a web page that enables the user to register at least one interest comprises means for generating a web page that enables the user to register at least one URL for any one or more of the predetermined events.

21. The web access mechanism of claim 20, further comprising means for sending a message specifying any one of the predetermined events to the URL registered for the any one of the predetermined events using an HTTP post method.

* * * * *